Figure 1:
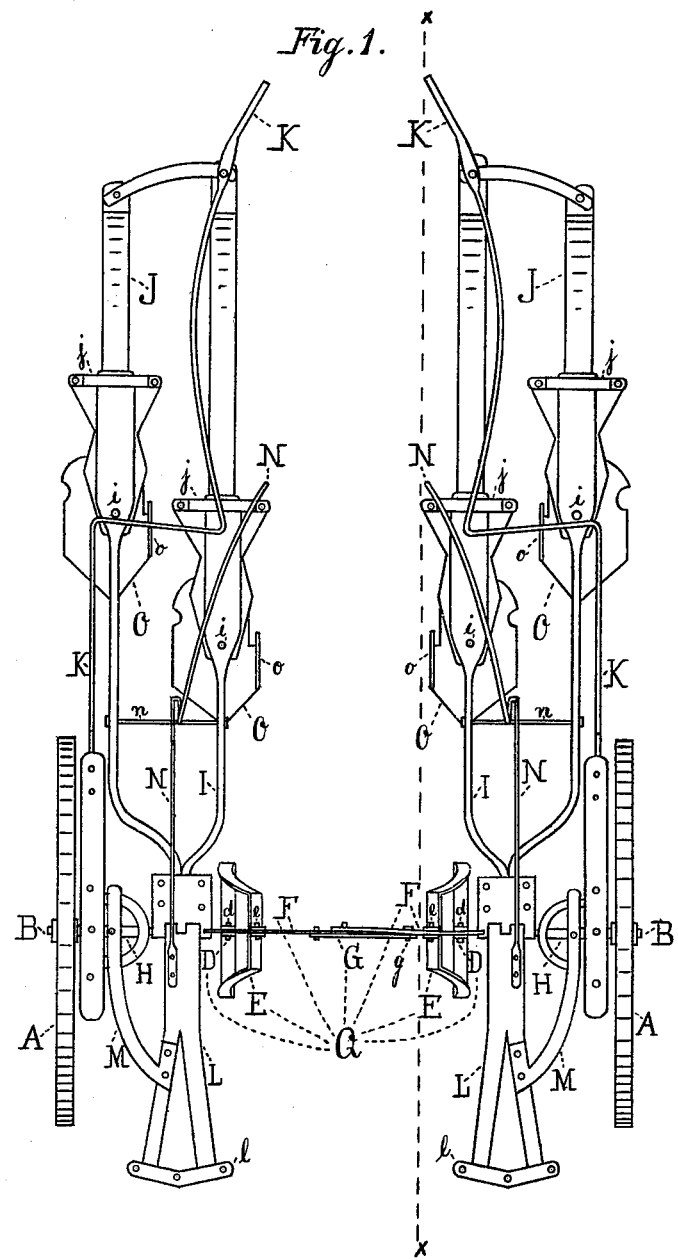

2 Sheets—Sheet 1.

J. M. LUDLOW & S. C. PRUITT.
Cultivator.

No. 198,204. Patented Dec. 18, 1877

WITNESSES
James B. Ligius.
Robt. E. Bond.

INVENTORS
John M. Ludlow,
Sanford C. Pruitt,
per C. Bradford
Attorney.

2 Sheets—Sheet 2.
J. M. LUDLOW & S. C. PRUITT.
Cultivator.
No. 198,204.      Patented Dec. 18, 1877.
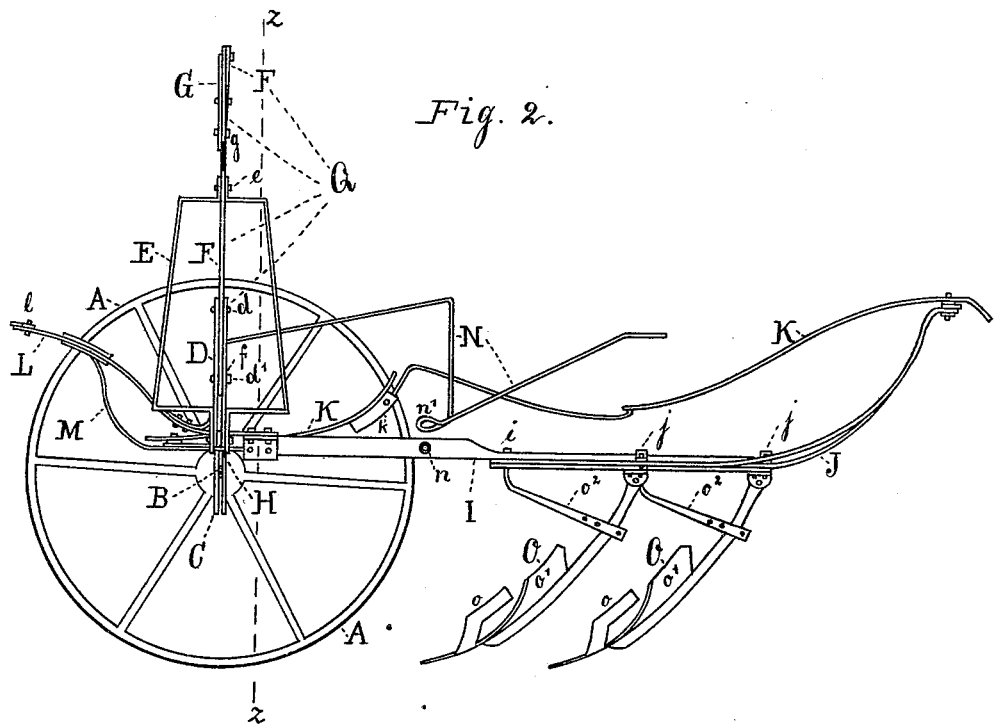
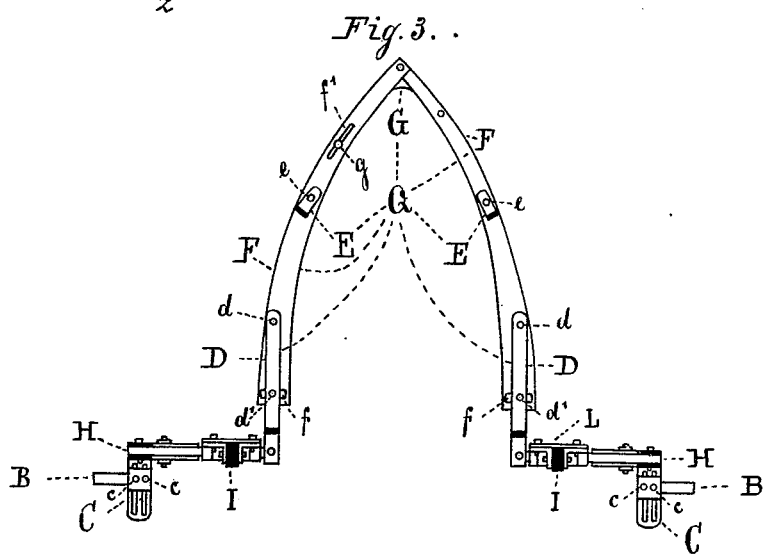

UNITED STATES PATENT OFFICE.

JOHN M. LUDLOW AND SANFORD C. PRUITT, OF HALL, INDIANA.

IMPROVEMENT IN CULTIVATORS.

Specification forming part of Letters Patent No. 198,204, dated December 18, 1877; application filed September 17, 1877.

*To all whom it may concern:*

Be it known that we, JOHN M. LUDLOW and SANFORD C. PRUITT, of the town of Hall, county of Morgan, and State of Indiana, have invented certain new and useful Improvements in Cultivators, of which the following is a specification:

Reference is had to the accompanying drawings, which are made a part hereof, and on which similar letters of reference indicate similar parts.

Figure 1 is a top or plan view of our invention. Fig. 2 is a longitudinal vertical section thereof, looking to the left from a point shown by the dotted line $x\ x$; and Fig. 3 is a transverse vertical section thereof, looking to the left from the dotted line $z\ z$.

Those portions of the drawings marked A are the cultivator-wheels; B, the spindles thereto; C, devices in which the spindles are fastened, and which are so arranged that the spindles are easily moved upward or downward therein, as it is desired to have the plows O work at a greater or less depth, and which have the bolts $c\ c$, by which said spindles are fastened after being placed in position. Those marked D, E, F, and G are component parts of the arch Q, and are so constructed that the said arch can be readily varied, both in width and height, at pleasure.

H H are short shafts connecting the devices C C and the arch Q, and to which the plow-beams, draft-bars, and regulating-levers are attached.

I I are the plow-beams; J J, the handles thereto; $i\ i$, pivots, and $j\ j$ straps connecting the beams and handles together, in such a manner that the course of the plows can be changed at will. The pivots $i\ i$ are, preferably, directly above the points of the plows, as this arrangement renders the changing of the course of the plows easier of accomplishment.

K K are regulating-levers or connecting-rods between the handles J J and the shafts H H, and are so arranged that the movement of the handles in changing the course of the plows shall produce a corresponding change in the course of the wheels.

L L are the draft-bars, by which the cultivator is drawn, and which have several holes in the bar $l$, to serve as points of attachment, thus allowing for variations in the strength of the animals or in the width of the rows. They are connected to the shafts H H, both directly and by means of the braces M M, so that they shall have the requisite amount of lateral strength.

N N are supporting-bars attached to the draft-bars L L, and provided with hooks $n'$, which are designed to engage with the small bar $n$ in the plow-beam I, and thus prevent the plows from touching the ground while driving to or from the place where the work is to be performed.

O O are the plows, which are made after the ordinary manner of shovel-plows, except that they have a cutter, $o$, and a mold-board, $o'$. They are attached to the shafts H H by means of the plow-beams I I, and in such a manner that no lateral movement can take place except what is allowed by the changes in the course of the wheels; and the operator is thus relieved of the labor of continually holding the plows in place, as is the case when the plow-beams are hinged laterally.

The principal object of our invention is to produce a cultivator which can be so varied as to be used with equal facility and to equal advantage under all the circumstances of varying and crooked rows and varying heights of the corn. This is accomplished by constructing the arch of several pieces, and having them so arranged that by means of the pivots, slots, and bolts shown they can be made the subject of numerous variations, which enables the operator to set the arch to the exact size necessary, and with but little loss of time.

We have also made various other improvements in the construction of our cultivator, which will be apparent on examination of our specification and drawings.

The construction and operation of the arch Q are substantially as follows: The parts D D and E E are rigidly attached to the shafts H at the bottom. Between these parts is the part F, which is pivoted to them at $d$ and $e$, and which is widened at the bottom end, where it has the slot $f$, through which runs the bolt $d'$. By means of these slots and bolts the shafts H H are kept in line and the wheels upright, notwithstanding the variations in the arch. The various holes in these parts will be easily understood as the points to which the bolts are changed when raising or lowering the arch. At the top, and connecting the two sides of the arch, is the part G, which is provided with a bolt at each end. At one end of this device, in the part F, is a slot, $f'$, which allows the free play of the bolt $g$ when loosened, and permits the arch to be widened at pleasure, but when tightened keeps it perfectly firm and rigid.

The plows of our cultivator are themselves of a peculiar construction, being at once a shovel and a mold-board plow, and having a cutter on the inner edge. We believe this construction to have the advantage of working the ground more thoroughly and evenly than any other which does not pile the earth too high about the corn.

The construction of the joint by which we vary the course of the wheels and plows is simple and practical, consisting of a widened end to the plow-beam I, connected to the handle J by the pivot $i$ and the strap $j$, and aided by the lever K, connecting the handles J and the shaft H. This lever K is constructed of two parts, connected by the joint $k$. The forward end of this lever is firmly attached to the device C, and can be extended a sufficient distance to the front to take the place of the draft-bars L, and, when so used, the operator can, by reining the animals, throw on them the labor of changing the course of the wheels and plows, and thus relieve himself of a very considerable task.

Having thus fully described our invention, what we claim as new, and desire to secure by Letters Patent, is—

1. The combination of the parts D D, E E, F F, and G, forming the arch to a cultivator, and constructed and operated substantially as specified.

2. The combination of the shaft H, the device C, constructed of two parts, as shown, and having two slots, in which the bolts $c\,c$ are operated, the bolts $c\,c$, and the spindle B, constructed and operated substantially as herein shown and described, and for the purpose specified.

3. The combination of beam I, pivot $i$, handle J, and the plow-standard, forming a variable joint, substantially as specified.

4. The combination of handles J, jointed lever K, and shaft H, substantially as herein shown and described, and for the purpose specified.

5. The shovel-plow O, constructed as shown, having a mold-board and a cutter, said cutter being separated from said mold-board for the greater part of its length, and arranged substantially as specified.

6. The combination of the forward end of the lever K with the device C, the shaft H, and draft-bars L M, substantially as herein shown and described, and for the purpose herein specified.

In witness whereof we have hereunto set our hands and seals, at Indianapolis, Indiana, this 12th day of September, A. D. 1877.

JOHN M. LUDLOW. [L. S.]
SANFORD C. PRUITT. [L. S.]

In presence of—
C. BRADFORD,
C. E. PRUITT.